WILLIAM C. BOWMAN.
Improvement in Corn-Planters.
No. 114,908.  Patented May 16, 1871.
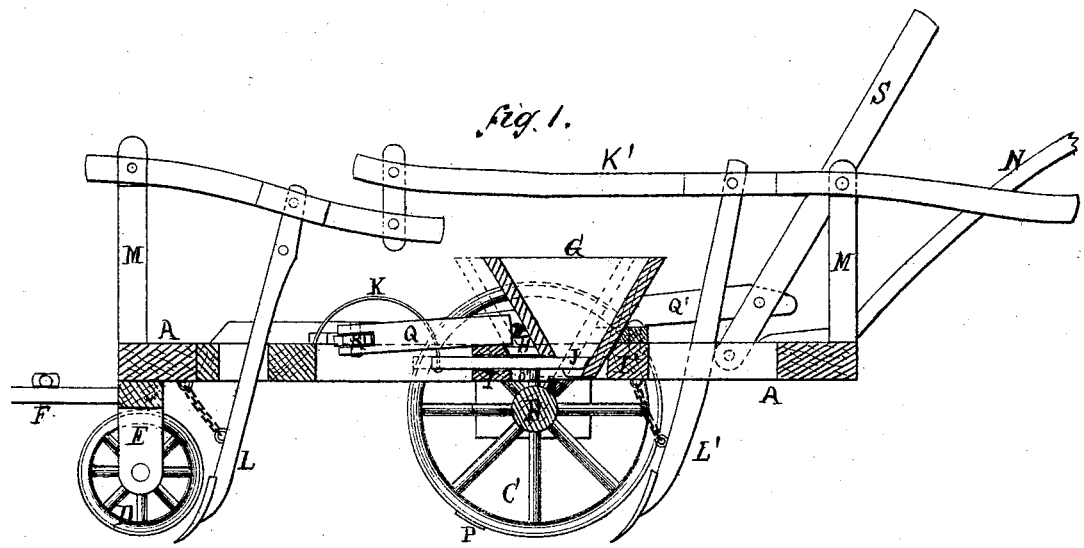
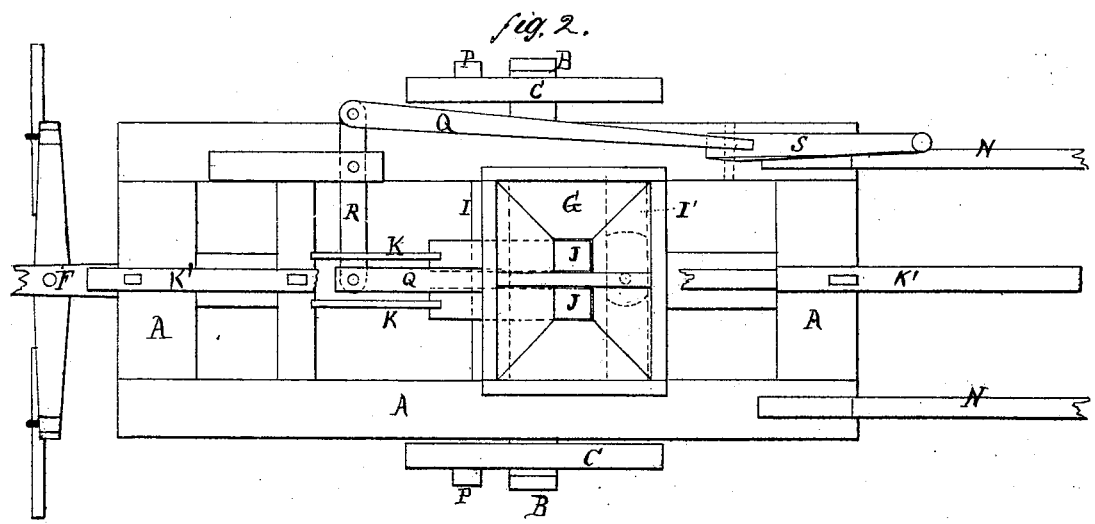

United States Patent Office.

WILLIAM C. BOWMAN, OF CLARKSBURG DISTRICT, MARYLAND.

Letters Patent No. 114,908, dated May 16, 1871.

IMPROVEMENT IN CORN-PLANTERS.

The Schedule referred to in these Letters Patent and making part of the same.

*To all whom it may concern:*

Be it known that I, WILLIAM C. BOWMAN, of Clarksburg district, in the county of Montgomery and State of Maryland, have invented a new and improved Corn-Planter; and I do hereby declare the following to be a full, clear, and exact description of the same, reference being had to the accompanying drawing forming part of this specification, in which—

Figure 1 is a longitudinal section of my improved corn-planter.

Figure 2 is a plan view of the same.

Similar letters of reference in the drawing denote corresponding parts.

My invention relates to that class of corn-planters wherein the machines are mounted on wheels and are automatic in their action, as will be hereinafter more fully described.

In the accompanying drawing—

A is the rectangular frame of the corn-planter mounted upon the axle B, which turns with the wheels C and has its bearings in the under side of the frame at or a little in rear of the center.

The forward part of the frame is supported by a single wheel, D, hung in the swiveled bolster-frame E, which bolster-frame also carries the draft-pole F, as shown.

G is the hopper, mounted upon the frame A in rear of the axle, and adapted to slide forward and backward upon guides H H attached to the cross-bars I I'.

J J are the grain-slides in the bottom of the hopper, arranged parallel to each other and longitudinally of the frame A.

Their forward ends pass through the cross-bar I, and are attached to bent metallic springs K, whose forward ends are secured to a cross-bar of the frame A, as shown.

L L' are shovels or plows, pivoted to a jointed lever, K, which in turn is pivoted to uprights M upon the front and rear of the frame, said shovels being arranged, respectively, in front of and in rear of the hopper.

The longer arm of the lever projects beyond the rear end of the frame within reach of the operator, who walks behind the machine and controls its movements by means of the handles N, as shown.

The operation is as follows:

The hopper being filled with seed the machine is set in motion, when the driver moves the handle of the jointed lever up and down once to throw the shovels into and out of the ground with a rapid movement.

By this movement the forward shovel L forms a hole or recess in the ground to receive the seed.

O are pins attached to the axle, which, as the axle rotates, strike the seed-slides J, or pins O' projecting therefrom, moving said slides forward to discharge the seed.

As soon as the pins have cleared the slides the latter are thrown quickly back by the springs K to close the bottom of the hopper. The movement of the slides is so rapid that only the requisite quantity of seed is dropped at each operation.

The movements of the jointed lever should be so timed that the slides shall be tripped to discharge the seed directly into the recesses formed by the forward shovel.

As a proper guide for its movements I have arranged, upon the periphery of the wheels C, blocks or washers P, and as these washers touch the ground when the wheels rotate the shovels should be operated.

The washers also serve to designate the planted hills, and thus preserve their alignment.

The rear shovel L' is employed to cover the seed dropped into the recess formed by the first shovel.

The two shovels operate together in such a manner (after the first hill is planted) that the one, L', strikes the ground and covers the seed simultaneously with the movement of the one L in forming a recess next in front of the one being covered.

In the drawing the hopper is shown provided with two slides for dropping two hills at a time but this is not essential, as one or many may be used, according to circumstances, or as preferred.

To throw the dropping mechanism out of gear while the machine is being moved from place to place I have arranged the hopper to slide upon the frame in the following manner:

To its front side a bar, Q, is pivoted to the inner end of a short bar, R, which in its turn is pivoted near the outer end to the frame of the machine, and at its outer end to a third and longer bar, Q', extending to the rear of the frame near the hopper, at which point it is pivoted to the upright operating-lever S.

By this arrangement a backward pull upon the lever moves the hopper forward upon the guides H until the slides have cleared the tripping-pins of the axle, in which position it is held by a button upon the cross-bar I', which is turned against its rear side, as will be readily understood.

If desired, a driver's seat may be arranged upon the frame, and the jointed lever K' operated from the center or other convenient point.

I prefer, however, the arrangement described, as affording better means for controlling the movements of the machine.

Having thus described my invention,
What I claim as new therein, and desire to secure by Letters Patent, is—

1. The jointed lever K' carrying the plows L L', arranged, respectively, in front and rear of the hopper, and operating in connection with the dropping mechanism, substantially as herein shown and described.

2. The hopper G and spring seed-slides J, when made adjustable upon the frame with relation to the tripping mechanism, substantially as described, for the purpose specified.

3. In combination with the hopper and seed-slides, the pivoted connecting-bars, and the operating-lever S, substantially as described, for the purpose specified.

WILLIAM C. BOWMAN.

Witnesses:
N. K. ELLSWORTH,
E. A. ELLSWORTH.